United States Patent
Sturmat

(10) Patent No.: US 10,336,245 B2
(45) Date of Patent: Jul. 2, 2019

(54) METHOD FOR OPERATING AN EXTERNALLY VISIBLE ILLUMINATION OF A TRANSPORTATION VEHICLE AND TRANSPORTATION VEHICLE FOR CARRYING OUT THE METHOD

(71) Applicant: VOLKSWAGEN AG, Wolfsburg (DE)

(72) Inventor: Sandra Sturmat, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/969,833

(22) Filed: May 3, 2018

(65) Prior Publication Data

US 2018/0319321 A1 Nov. 8, 2018

(30) Foreign Application Priority Data

May 3, 2017 (DE) .................. 10 2017 207 435

(51) Int. Cl.
*B60Q 1/26* (2006.01)
*B60Q 1/32* (2006.01)
*B60Q 1/50* (2006.01)
*B60Q 1/24* (2006.01)

(52) U.S. Cl.
CPC .............. *B60Q 1/2619* (2013.01); *B60Q 1/26* (2013.01); *B60Q 1/268* (2013.01); *B60Q 1/32* (2013.01); *B60Q 1/323* (2013.01); *B60Q 1/50* (2013.01); *B60Q 1/24* (2013.01); *B60Q 1/2696* (2013.01); *B60Q 2400/10* (2013.01); *B60Q 2400/20* (2013.01)

(58) Field of Classification Search
CPC .......... B60Q 1/24; B60Q 1/26; B60Q 1/2619; B60Q 1/2696; B60Q 1/32
See application file for complete search history.

(56) References Cited

U.S. PATENT DOCUMENTS

| 5,838,259 | A | 11/1998 | Tonkin | |
|---|---|---|---|---|
| 6,231,217 | B1 | 5/2001 | Krippelz, Sr. | |
| 6,928,180 | B2* | 8/2005 | Stam | B60Q 1/085 315/82 |
| 10,059,263 | B2* | 8/2018 | Paszkowicz | B60Q 1/24 |
| 10,112,528 | B1* | 10/2018 | Mazuir | B60Q 1/444 |
| 2016/0016506 | A1 | 1/2016 | Collins et al. | |
| 2017/0190284 | A1* | 7/2017 | Na | B60Q 1/46 |

FOREIGN PATENT DOCUMENTS

| DE | 19745993 A1 | 4/1999 |
|---|---|---|
| DE | 10154227 A1 | 5/2003 |
| DE | 102005044404 A1 | 3/2007 |

(Continued)

*Primary Examiner* — Thuy V Tran
(74) *Attorney, Agent, or Firm* — Barnes & Thornburg LLP

(57) ABSTRACT

A method for operating externally visible lighting of a motorized transportation vehicle and a motorized transportation vehicle configured to operate externally visible lighting, wherein a number of luminous regions are varied sequentially producing a light effect image varying continuously relative to the motorized transportation vehicle in a longitudinal direction, the sequential variation of the luminous regions generated when the motorized transportation vehicle is driving off so that the light effect image moves with at least one change boundary region relative to the motorized transportation vehicle in the opposite direction to the current direction of travel.

16 Claims, 11 Drawing Sheets

(56) References Cited

FOREIGN PATENT DOCUMENTS

| | | |
|---|---|---|
| DE | 102006050548 A1 | 4/2008 |
| DE | 102011014262 A1 | 9/2012 |
| DE | 102011083368 A1 | 3/2013 |
| DE | 202015006739 U1 | 12/2015 |
| DE | 202016000238 U1 | 2/2016 |
| DE | 102015220543 A1 | 4/2016 |
| DE | 102015012762 A1 | 5/2016 |
| EP | 1916154 A1 | 4/2008 |
| KR | 20130085806 A | 7/2013 |

\* cited by examiner

METHOD FOR OPERATING AN EXTERNALLY VISIBLE ILLUMINATION OF A TRANSPORTATION VEHICLE AND TRANSPORTATION VEHICLE FOR CARRYING OUT THE METHOD

PRIORITY CLAIM

This patent application claims priority to German Patent Application No. 10 2017 207 435.3, filed 3 May 2017, the disclosure of which is incorporated herein by reference in its entirety.

SUMMARY

Illustrative embodiments relate to a method for operating externally visible lighting of a motorized transportation vehicle and a motorized transportation vehicle for carrying out the method.

BRIEF DESCRIPTION OF THE DRAWINGS

Disclosed embodiments are represented in the figures and are described in detail using the figures in the following description. Identical reference characters, even in different figures, denote identical, comparable or functionally equivalent components. In this case, corresponding or comparable properties and results are achieved, even if a repeated description or reference thereto is not carried out. In the figures.

DETAILED DESCRIPTION

Figure 1:
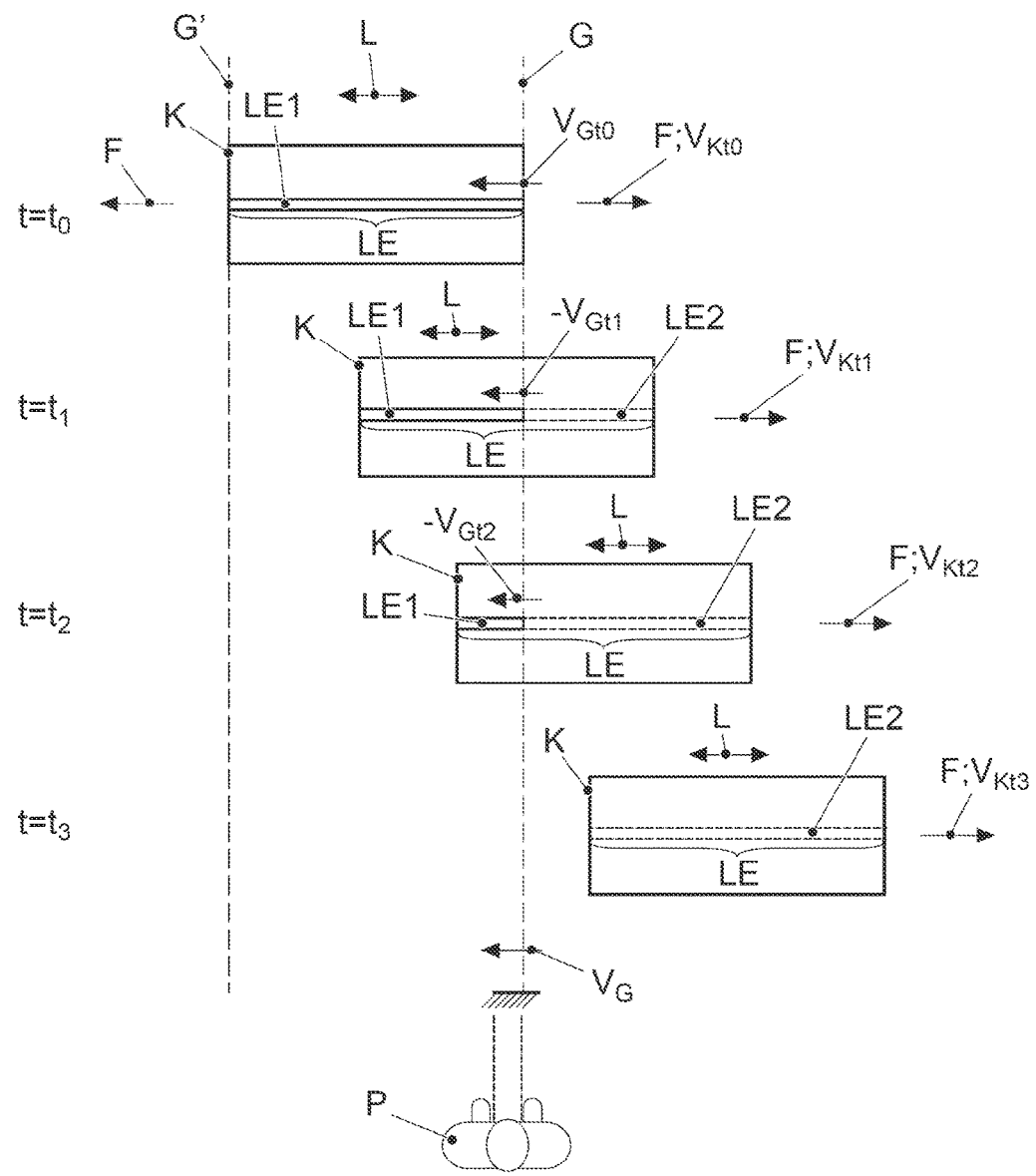
FIG. 1 schematically shows a representation of a motorized transportation vehicle when driving off from rest, which is being operated according to the disclosed method.

When buying today's motorized transportation vehicles, properties such as, for example, sportiness, economy, safety, environmental compatibility, price and design play an important part for the customer. Design also includes a suitable lighting design of a motorized transportation vehicle, which, for example, is influenced by the shape and arrangement of a daytime running light.

Moreover, it has recently become known from the general state of transportation vehicle technology to use moving light as a so-called coming-home function and/or leaving-home function for brand-specific individualization of a motorized transportation vehicle.

Thus, for example, when opening a motorized transportation vehicle by a radio key before getting in (leaving home), a moving light can be produced that moves in the longitudinal, lateral and/or vertical direction of the motorized transportation vehicle. A suitable moving light is conceivable when locking the motorized transportation vehicle by the radio key after completing a journey and after leaving the motorized transportation vehicle (coming home).

A method is known from DE 197 45 993 A1 wherein a motorized transportation vehicle is fitted on the outer skin of the body of the transportation vehicle with electroluminescent light bands that extend continuously along the strake of the transportation vehicle from a front headlamp to a rear light. The light bands are made up of a number of small, individually actuated individual segments. By suitable actuation, a moving light can thus be produced that is carried out depending on certain driving maneuvers. It is proposed that during a parking or unparking maneuver of the motorized transportation vehicle the moving light is operated so that the direction of motion thereof corresponds to the respective direction of travel of the transportation vehicle.

In EP 1 916 154 B1, a method for representing information is described, with which a selective projection of light images outside a motorized transportation vehicle is carried out. In this case, a change of the projection is carried out depending on a certain driving situation. For example, it is proposed that a motorized transportation vehicle indicates an intention to turn by an arrow symbol projected onto the road. By the displayed arrow symbol, it is thus visible to other road users that the motorized transportation vehicle is turning in a certain direction.

The disclosed embodiments provide a method for operating externally visible lighting of a motorized transportation vehicle that contributes to the brand-specific individualization of a motorized transportation vehicle.

Disclosed embodiments also provide a suitable motorized transportation vehicle that can carry out the disclosed method.

The disclosure is initially based on a method for operating the externally visible lighting of a motorized transportation vehicle. In this case, the operation is carried out in such a way is carried out that a number of luminous regions are changed sequentially in such a way that a light effect image is produced that varies continuously in relation to the motorized transportation vehicle in a longitudinal direction of the motorized transportation vehicle.

In this case, the luminous regions can, for example, be directly formed by a number of luminous devices, such as, for example, light emitting diodes (LEDs). It is, however, also conceivable that the luminous regions are only formed indirectly, for example, by lenses disposed downstream of suitable luminous devices. It is also conceivable that the luminous regions are formed by light output coupling structures in light conducting elements, by luminous films or similar, wherein the list is not intended to be exhaustive.

The disclosure proposes that the sequential variation of the luminous regions when the motorized transportation vehicle is driving off is carried out in such a way that the light effect image is moving with at least one change boundary region relative to the motorized transportation vehicle in the opposite direction to the current direction of travel thereof.

Thus, if the transportation vehicle starts in a normal direction of travel (forwards), then the change boundary region moves backwards, i.e., towards the rear of the transportation vehicle. If the motorized transportation vehicle drives backwards from rest, then the change boundary region moves forwards, i.e., towards the headlamp of the motorized transportation vehicle.

Owing to the method, a highly original light effect image can be produced, which can contribute excellently to the brand-specific individualization of a motorized transportation vehicle.

In this case it is to be noted that the change boundary region is a region in which a defined luminous region changes directly from one defined state into another state. In this case, the state can, for example, be characterized by the level of the luminous intensity and/or by the color of the emitted light.

A development proposes that the sequential variation of the luminous regions is synchronized with a current speed of travel of the motorized transportation vehicle in such a way that a speed of the change boundary regions moving relative to the motorized transportation vehicle in the opposite direction to the current direction of travel corresponds to the current speed of travel. In other words, the luminous regions are thus varied in such a way that an observer has the impression of the change boundary region being almost at rest.

This ultimately results in the impression for an observer observing the motorized transportation vehicle from the side that the motorized transportation vehicle that is driving off is driving out of "the light clothing thereof".

This can be achieved very clearly if, according to another development, the sequential variation of the luminous regions is brought about by switching off the luminous regions. The light intensity of the light emanating from the luminous regions or the luminous devices associated therewith is thus suddenly reduced to zero.

The effect can however also be achieved by bringing about the sequential variation of the luminous regions by a detectable increase or reduction in the light intensity of the light emanating from the luminous regions or even by a change from one defined color to another defined color of the light emanating from the luminous regions.

A highly memorable and original effect can be achieved by the method if at least luminous regions disposed along a lateral window line are varied sequentially. In this case, the lateral window line may only comprise the window sill, i.e., the line below the window. It is however also conceivable that the window line also comprises the line above the side window.

The method is embodied similarly effectively if luminous regions that are disposed at least over the course of a lateral strake of the body are varied sequentially. The luminous regions can then extend laterally on the motorized transportation vehicle starting from the hood, over the A pillar, along the roof and, in motorized transportation vehicles with a notchback, finally along the C pillar and along the trunk lid.

A good visual effect can further also be achieved if at least luminous regions of lateral attachments are varied sequentially. The lateral attachments can, for example, be external mirrors, door handles or even trim.

Finally, as a result a highly memorable visual effect can also be achieved if at least luminous regions within the areas of the side window are varied sequentially. When driving off, for example, the impression can be created as if a "curtain of light" has been drawn from the front windows to the rear windows.

As already mentioned however, a motorized transportation vehicle for carrying out the disclosed method is to be placed under protection with the disclosure. A suitable motorized transportation vehicle for carrying out the method comprises a number of luminous regions along a longitudinal direction of the motorized transportation vehicle, by which a light effect image continuously varying relative to the motorized transportation vehicle in the longitudinal direction of the motorized transportation vehicle can be produced. The luminous regions can consist of luminous devices, such as, for example, LEDs or even film-like luminous devices, such as, for example, electroluminescent films or OLED films (OLED=Organic Light Emitting Diodes) or even simply of light-emitting regions to which the light is fed from the luminous devices that are being used.

The motorized transportation vehicle is now characterized by at least one control device for the sequential actuation of luminous devices for the variation of the luminous regions. In this case, signals of at least one wheel sensor can be analyzed by the control device in such a way that the control device carries out the actuation of the luminous devices when the motorized transportation vehicle is driving away in such a way that the light effect image with at least one change boundary region moves relative to the motorized transportation vehicle in the opposite direction to the current direction of travel thereof.

According to one development, the control device can analyze the signals of the at least a wheel sensor in such a way and can carry out the actuation of the luminous devices when the motorized transportation vehicle is driving away in such a way that the speed of the change boundary regions moving relative to the motorized transportation vehicle in the opposite direction to the current direction of travel corresponds to the current speed of travel of the motorized transportation vehicle.

Reference is first made to FIG. 1. A motorized transportation vehicle K is represented therein at four points in time of a time t (t0 to t3). At time t=t0, the motorized transportation vehicle K is at a standstill, and thus has a speed VKt0 of zero.

The motorized transportation vehicle K has a longitudinal extent or a longitudinal direction L. A light effect image LE also extends along the longitudinal direction L, wherein LE1 denotes a luminous part of the light effect image LE and LE2 denotes a non-luminous part of the light effect image LE.

As can be seen, as the motorized transportation vehicle K drives away the light effect image LE changes in such a way that in addition to the luminous part LE1 of the light effect image LE, a non-luminous part LE2 is added. In this case, the non-luminous part LE2 increases with increasing time t, until finally the light effect image LE only consists of the non-luminous part LE2. G denotes a change boundary region that characterizes the respective transition from the luminous part LE1 to the non-luminous part LE2 of the light effect image LE.

The change boundary region G has a speed VG that corresponds to a speed VGt0, VGt1 and VGt2 at the selected points in time t0 to t3. The speed VG is in the opposite direction to a direction of travel F or the driving speeds VKt0 to VKt3 of the motorized transportation vehicle at the points in time.

As already mentioned, the speed VGt0 of the change boundary region G at time t=t0 is zero, because the motorized transportation vehicle K is still at a standstill. At a time t=t3, the change boundary region G no longer exists, because the same has already moved out of the motorized transportation vehicle K in the opposite direction to the direction of travel F.

Figure 2:
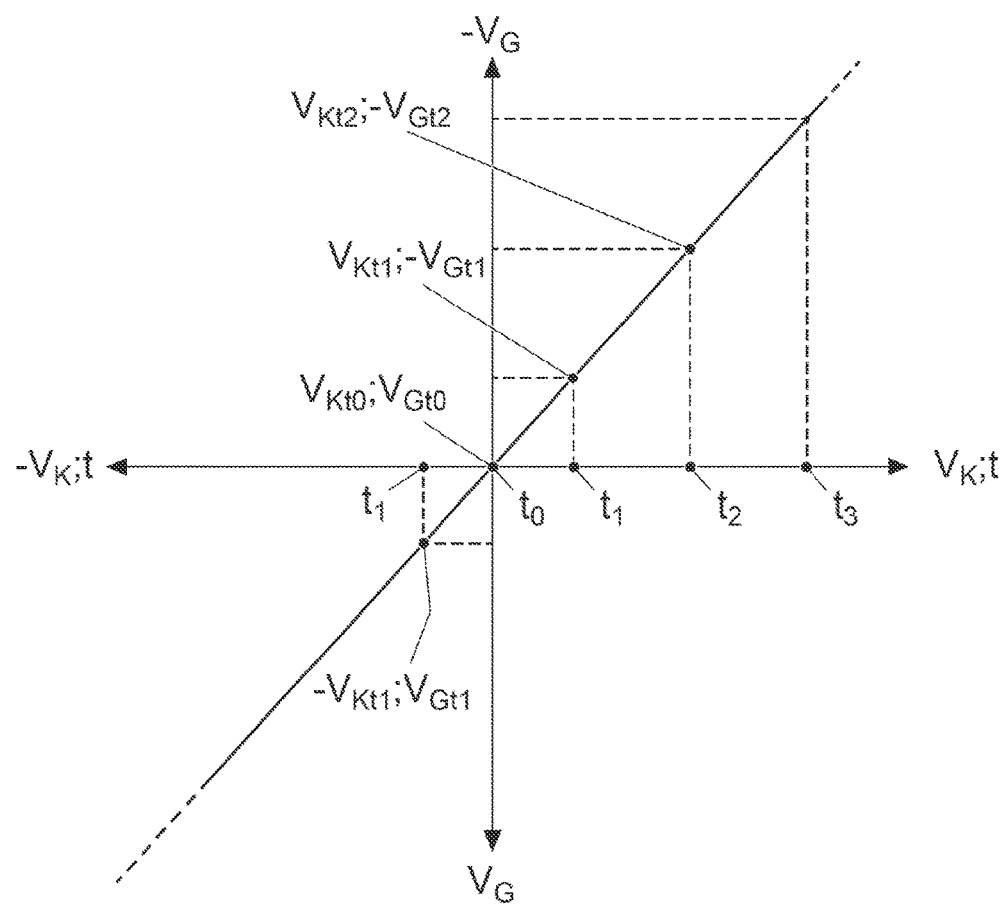
FIG. 2 schematically shows a diagram for representing the relationship between the speed of the transportation vehicle and the speed of the change boundary regions of the light effect image.

Using FIG. 2, it will be shown that the speed VG of the change boundary region G at all points in time t0 to t3 is equal in magnitude or at least about the same as the speed of travel VK. Thus, at a time t=t1 a speed of travel VKt1 of the motorized transportation vehicle K corresponds in magnitude to a speed VGt1 of the change boundary region G. At a time t=t2, the speed of travel VKt2 also corresponds in magnitude to the speed VGt2 of the change boundary region G and so on.

The result of this is that a person P looking at the motorized transportation vehicle K from the side has the impression that the change boundary region G is stationary, and the motorized transportation vehicle K is apparently driving out of the illuminated part LE1 of the light effect image LE.

Similarly, the disclosed method is carried out if the motorized transportation vehicle K is driving in an opposite direction of travel F (reversing, dashed line). In this case however, a change boundary region G' results, which starts at the opposite end of the light effect image LE (cf. FIG. 1).

Figure 3:
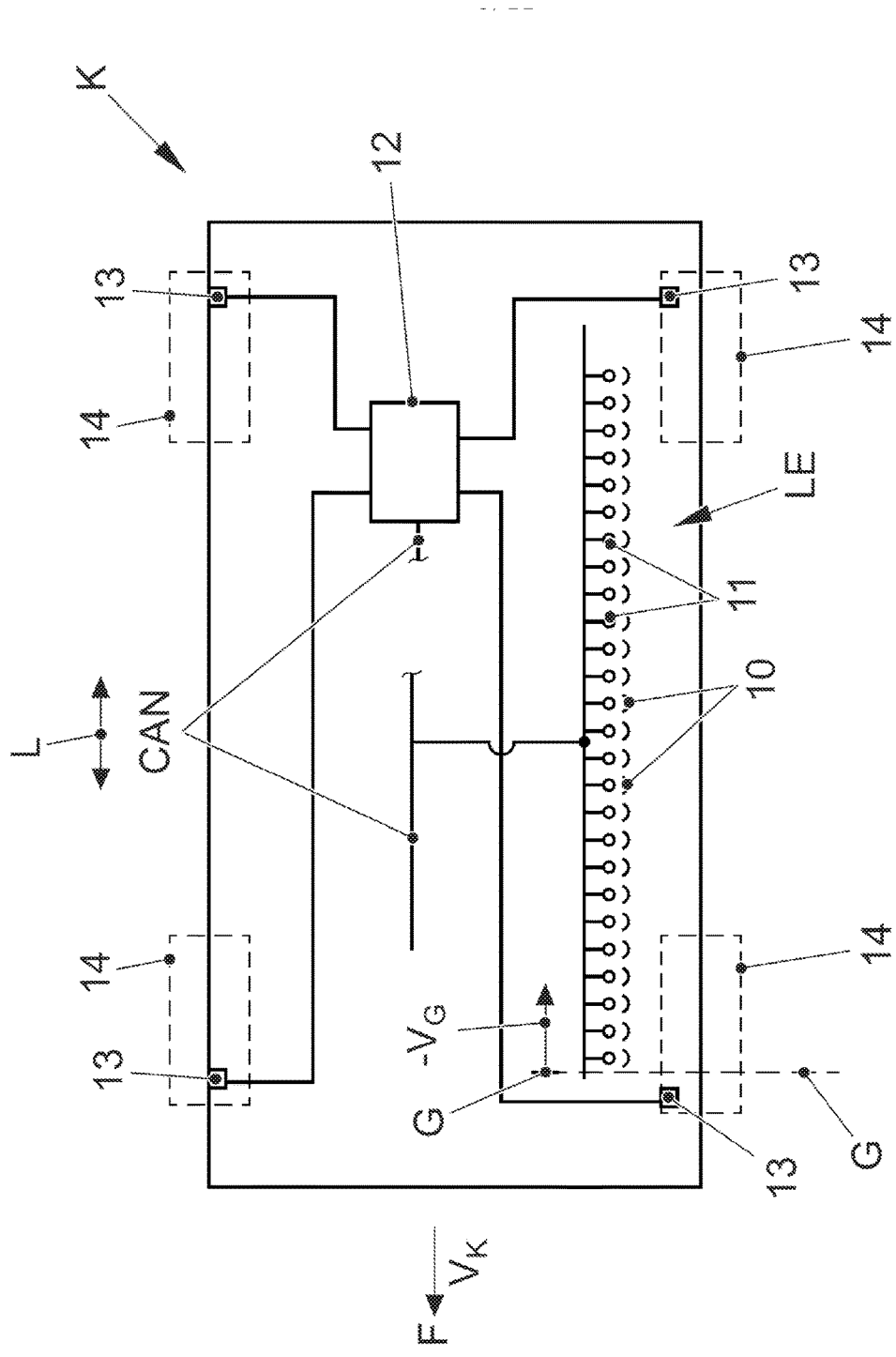
FIG. 3 schematically shows a representation of a motorized transportation vehicle for carrying out the disclosed method.
Figure 4A:
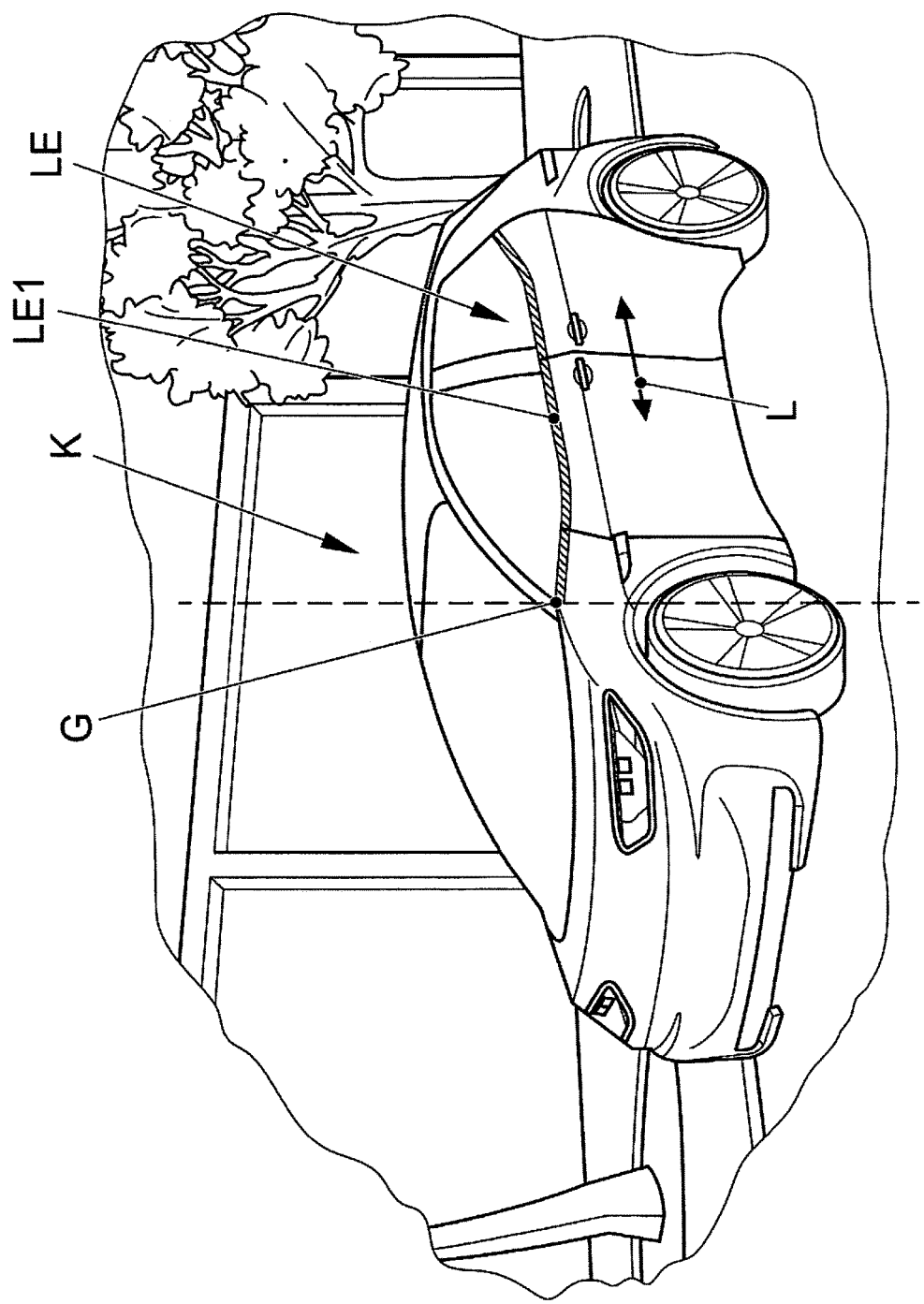
FIGS. 4a-d schematically show a representation of a motorized transportation vehicle that is driving away with a varying light effect image along the window sill thereof.
Figure 4B:
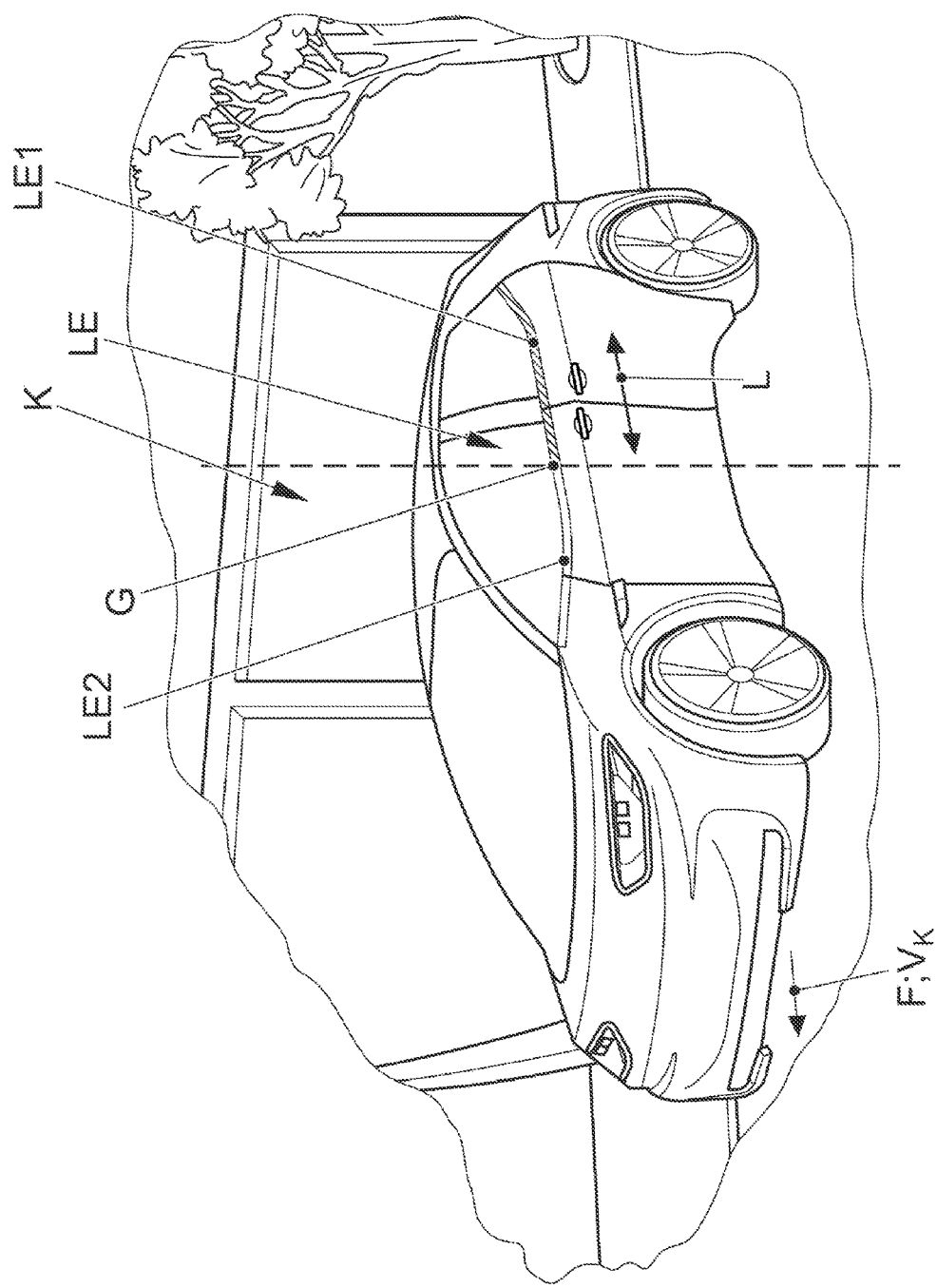
Figure 4C:
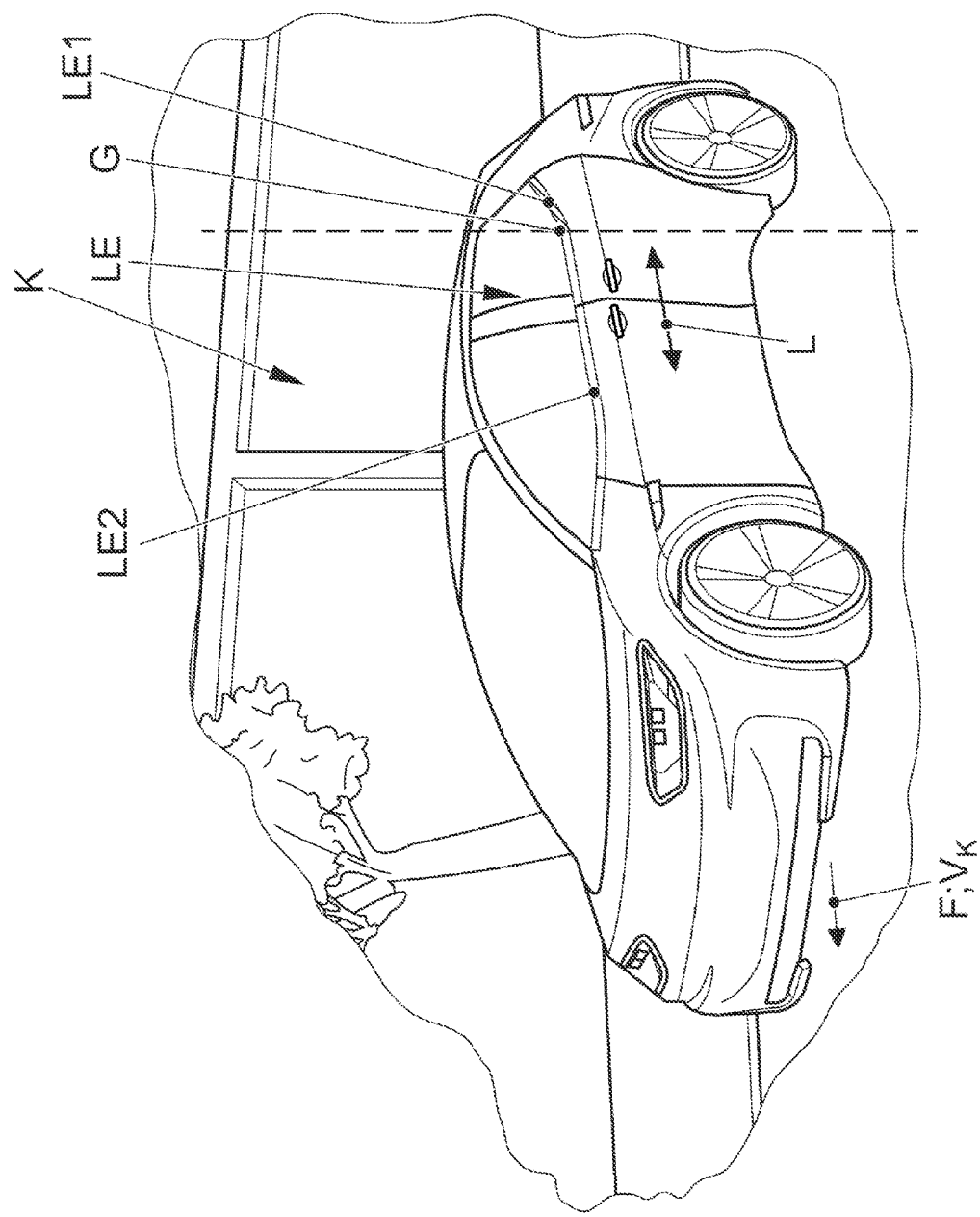
Figure 4D:
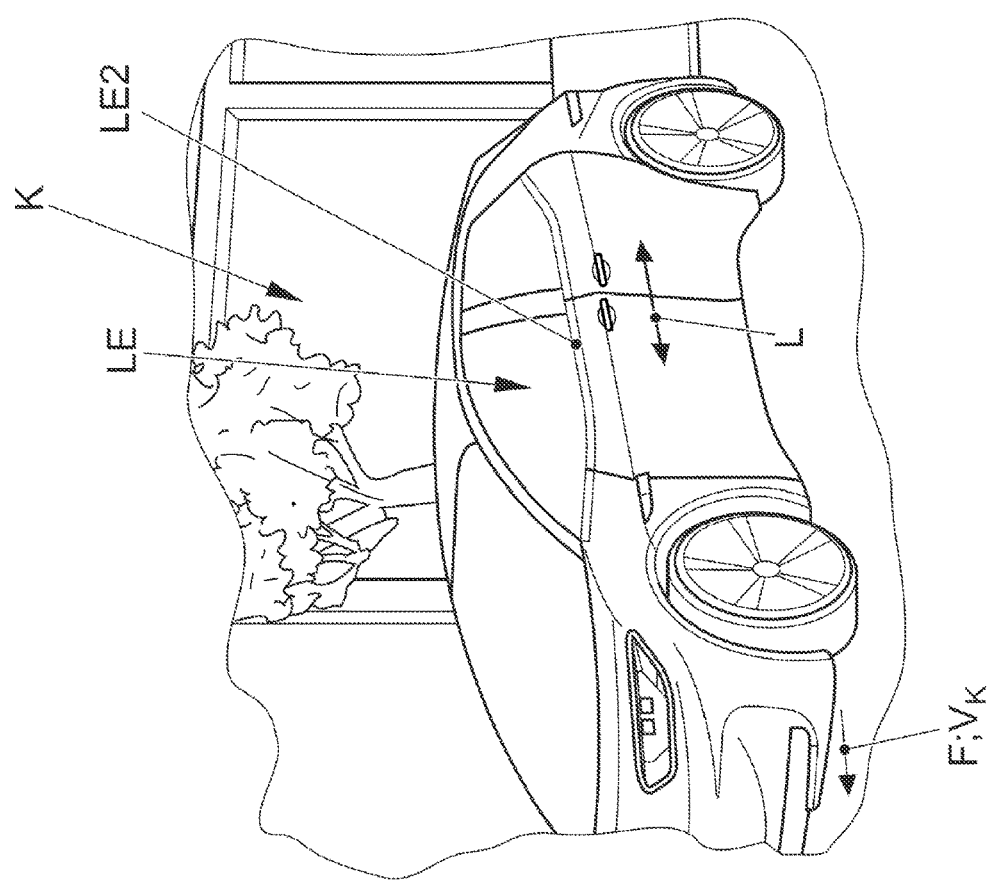

FIG. 3 shows by way of example a technical embodiment of the motorized transportation vehicle K, whereby it is suitable for carrying out the disclosed method. In this case, only the elements that are essential for comprehension of the disclosure are shown.

Thus, luminous regions 10 can be seen that extend along a longitudinal direction L of the motorized transportation vehicle K. The luminous regions 10 are in the present case embodied as diffusing lenses that are arranged optically downstream of luminous devices 11 as light emitting diodes (LEDs). The luminous devices 11 may be embodied as so-called RGB LEDs, so that the luminous device 11 and hence the luminous regions 10 can emit light of different desired colors.

A control device 12 is connected to wheel sensors 13 of wheels 14 for signal transmission purposes. The control device 12 can analyze signals of the wheel sensors 13 and can conclude therefrom the direction and magnitude of a speed of the transportation vehicle. The luminous device 11 can be actuated by the control device 12 depending on the direction and magnitude of a speed of the transportation vehicle.

In the present exemplary embodiment, it is assumed that the motorized transportation vehicle K is driving away from standstill at a speed VK in a direction of travel F. The direction of travel F can correspond to a normal direction of travel (i.e., forwards) or even reversing.

Starting from standstill of the motorized transportation vehicle K, in which all luminous device 11 are energized and thus all luminous regions 10 are also illuminated, a light effect image LE is thus formed by the luminous regions 10.

Once the motorized transportation vehicle K drives away, the luminous device 11 are actuated sequentially by the control device 12. The luminous device 11 are connected to the control device 12 for signal transmission purposes via a CAN bus. The actuation is now carried out in such a way that a first luminous device 11 in a change boundary region G is switched off, then the next luminous device 11 lying in the opposite direction to the direction of travel F, and so on, until finally the last luminous device lying on the far right in the figure is switched off. In addition, the speed of switching off is carried out so that the change boundary region G moves at such a speed VG in the opposite direction to the direction of travel F that corresponds to or at least approximately corresponds to the speed of travel VK in magnitude.

Using FIGS. 4a-d, an exemplary embodiment of a disclosed motorized transportation vehicle K is now described, in which the light effect image LE moves linearly along a window sill.

The motorized transportation vehicle K is thus initially at a standstill (FIG. 4a) and a light effect image LE is formed solely by a luminous part LE1. A change boundary region G is still disposed at the front in the region of an A pillar. After the motorized transportation vehicle K drives away at a speed VK in a direction of travel F (FIG. 4b), the change boundary region G moves along a longitudinal direction L of the motorized transportation vehicle K in the opposite direction to the direction of travel F, so that starting from the A pillar there is a non-luminous part LE2 and on the right of the change boundary region G there is a luminous part LE1. Shortly thereafter (FIG. 4c), the change boundary region G moves back further in the opposite direction to the direction of travel F, so that the unlit part LE2 of the light effect image LE is now already larger by a multiple than the illuminated part LE1. Finally (FIG. 4d), the change boundary region G is shifted so far rearwards in the opposite direction to the direction of travel F that the light effect image LE is now only formed by the unlit part LE2 and thus the window sill is no longer illuminated. Instead of switching the luminous device on and off to produce an illuminated part LE1 and an unlit part LE2, actuation of the luminous device can be carried out in such a way that a part LE1 is produced with a first color and a part LE2 is produced with a second color in a similar way.

Figure 5A:
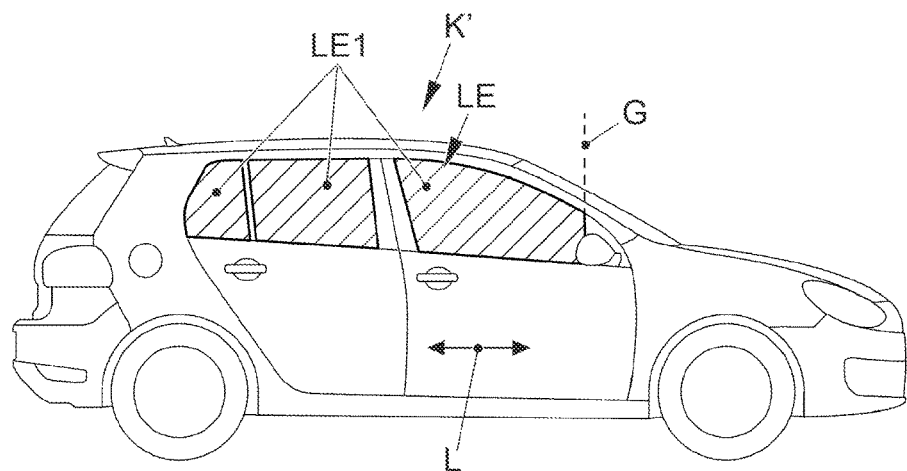
FIGS. 5a-d schematically show a motorized transportation vehicle that is driving away with a varying light effect image in the areas of the side window.
Figure 5B:
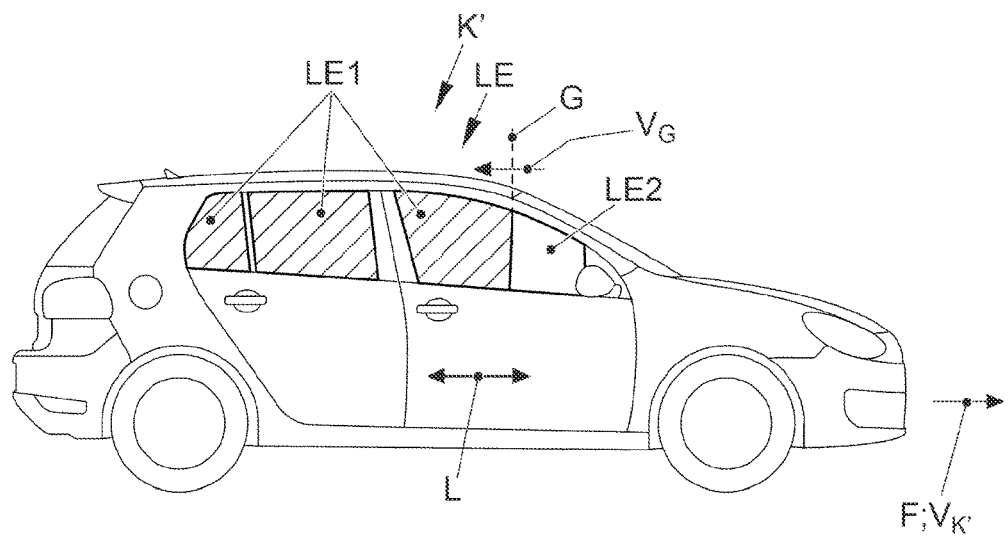
Figure 5C:
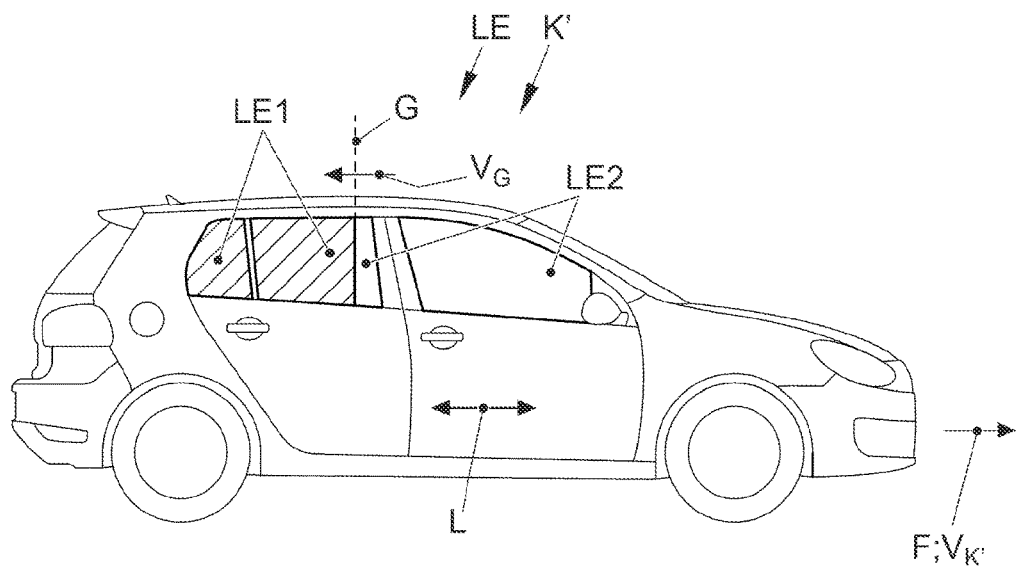
Figure 5D:
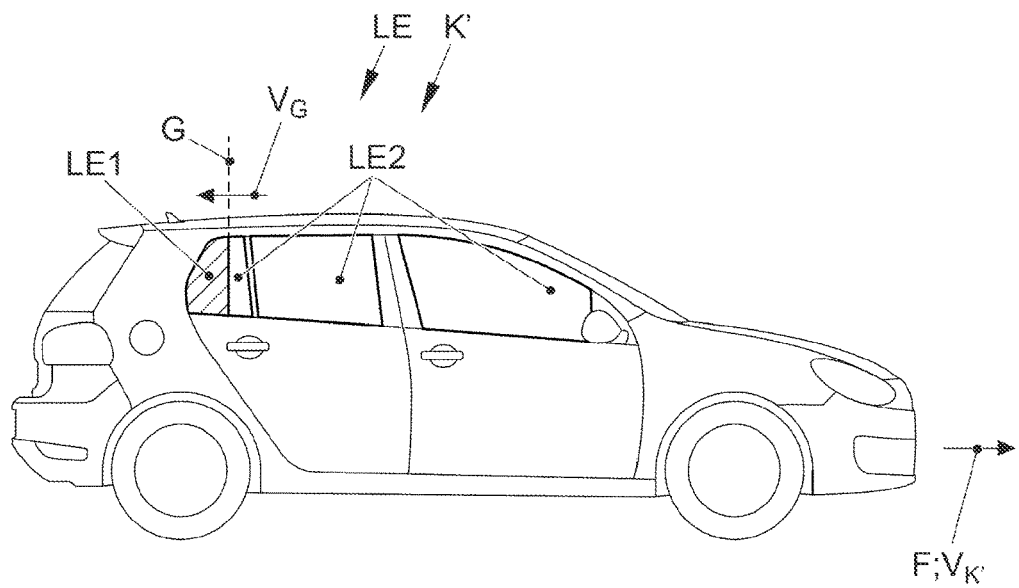
Figure 6A:
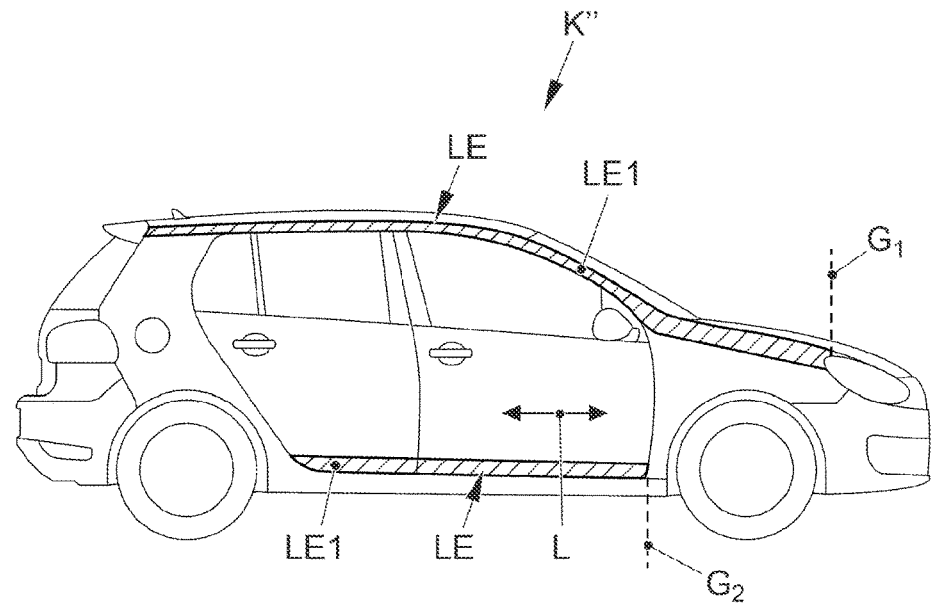
FIGS. 6a-d schematically show a motorized transportation vehicle that is driving away with a varying light effect image in the course of the strake on the body and in a trim strip in the region of the doorsill.
Figure 6B:
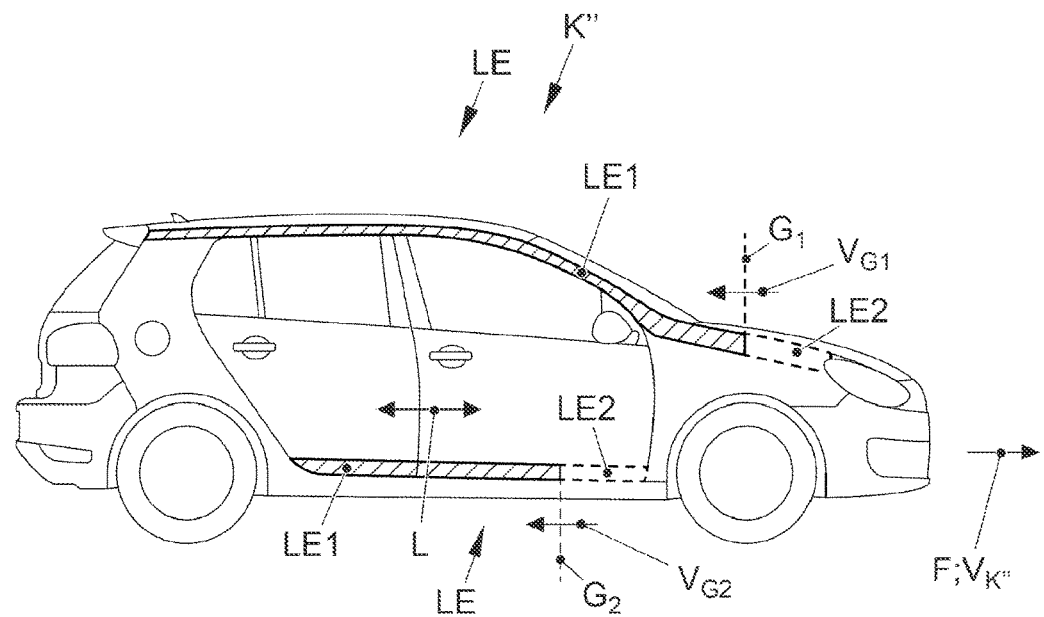
Figure 6C:
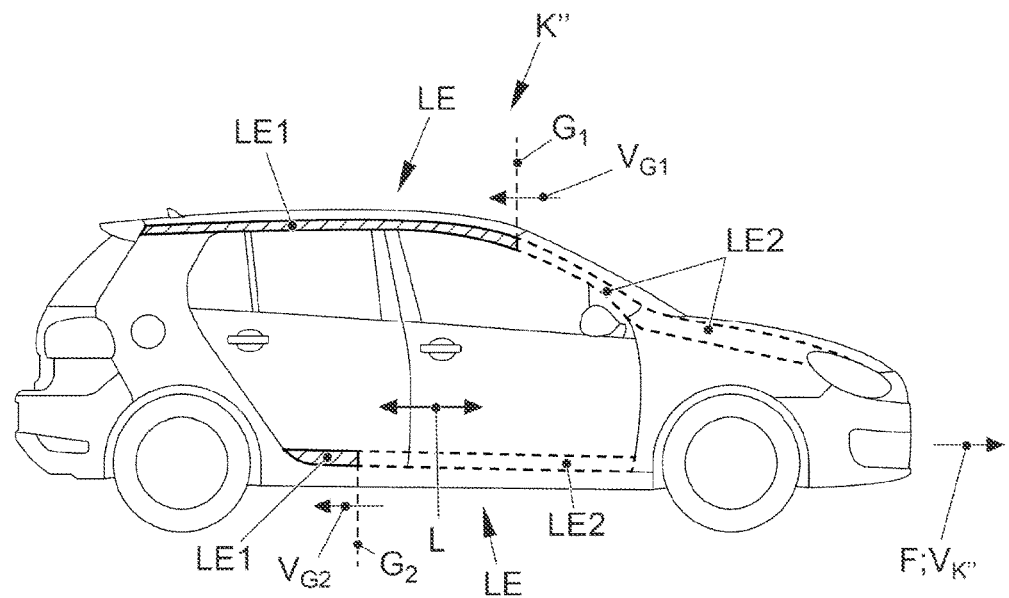
Figure 6D:
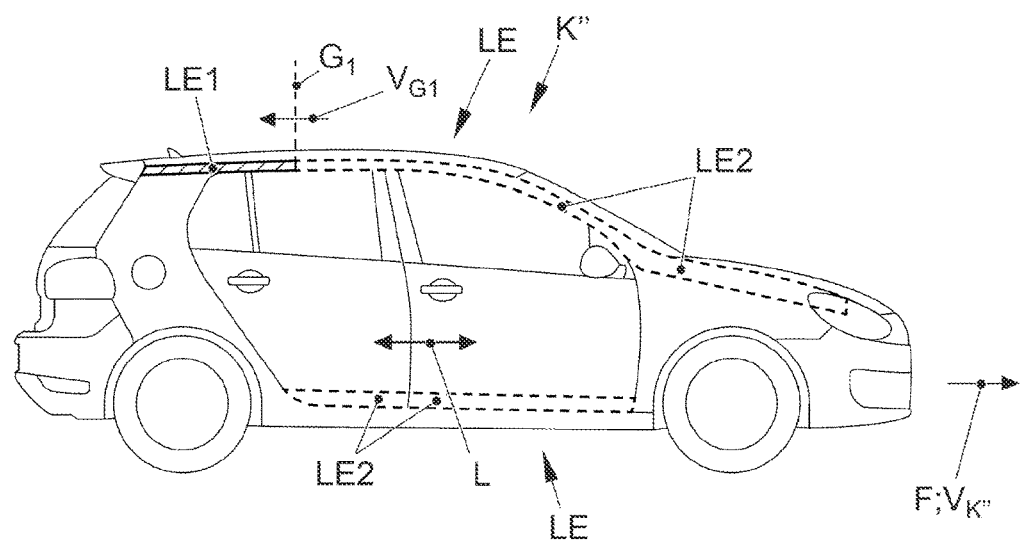

In the FIGS. 5a-d, an exemplary embodiment of a motorized transportation vehicle K' is represented, in which a light effect image LE is produced in the surfaces of the side windows and is varied. Accordingly, in the stationary transportation vehicle (FIG. 5a) the entire side windows are initially lit in such a way that there is a light effect image LE that exclusively consists of an illuminated part LE1. When the motorized transportation vehicle K' is started and for a speed VK' in a direction of travel F, a change boundary region G disposed in the region of an external mirror is moving in the longitudinal direction L of the motorized transportation vehicle K' with a speed VG in the opposite direction to the direction of travel F. There is thus a non-luminous part LE2 of the light effect image LE and in turn a luminous part LE1 (FIG. 5b). A short time later (FIG. 5c), the "curtain of light" has already been drawn to the extent that the change boundary region G is disposed in the rear window and the non-luminous part LE2 of the light effect image LE is already significantly larger than the luminous part LE1. In FIG. 5d, a state is represented in which the change boundary region G is disposed shortly before the movement out of the rearmost side window.

Finally, using the FIGS. 6a-d, another exemplary embodiment of a motorized transportation vehicle K" will be described, wherein a light effect image LE extends in the longitudinal direction L along an upper body strake of the motorized transportation vehicle K". There is a further light effect image LE along a lower trim-like attachment in the region of the doorsill.

Starting with the motorized transportation vehicle K" at a standstill (FIG. 6a), a first change boundary region G1 and a second change boundary region G2 are represented. Once the motorized transportation vehicle K" drives away at a speed VK" in a direction of travel F (FIG. 6b), the change boundary regions G1 and G2 move at speeds VG1 and VG2 in the opposite direction to the direction of travel F. In this case, the speeds VG1 and VG2 are of equal magnitude and in turn correspond in magnitude to the speed VK". The distance between the change boundary regions G1 and G2 in the longitudinal direction L thus remains approximately constant, as can also be seen in FIG. 6c. Finally, the change boundary regions G1 and G2 have moved so far in the opposite direction to the direction of travel F that the lower change boundary region G2 has already disappeared out of the lower light effect image LE, whereas the upper change boundary region G1 of the upper light effect image LE is still divided into a smaller illuminated part LE1 and a larger unlit part LE2. This also continues until the upper change boundary region G1 has completely disappeared out of the motorized transportation vehicle K".

REFERENCE CHARACTER LIST 10 luminous regions
1 luminous device; LEDs
12 control device
13 wheel sensors
14 wheels
CAN CAN Bus
F direction of travel
G, G' change boundary region
G1, G2 change boundary region
K, K', K" motorized transportation vehicle
L longitudinal direction
LE light effect image
LE1 part of the light effect image
LE2 part of the light effect image
P person
t time
t0-t3 points in time
$v_G$, $v_{G1}$, $v_{G2}$ speed of the change boundary regions
$v_{Gt0}$-$v_{Gt2}$ speed of the change boundary region at a defined point in time
$v_K$, $v_{K'}$, $v_{K''}$ speed of the motorized transportation vehicle
vKt0-vKt3 speed of the motorized transportation vehicle at a defined point in time

The invention claimed is:

1. A method for operating externally visible lighting of a motorized transportation vehicle, the method comprising sequentially varying a number of luminous regions produced by luminous devices arranged along a longitudinal direction of the motorized transportation vehicle so that a light effect image continuously varies relative to the motorized transportation vehicle at least in the longitudinal direction of the motorized transportation vehicle, wherein the sequential variation of the number of the luminous regions is carried out while the motorized transportation vehicle is driving away so that the light effect image moves with at least one change boundary region relative to the motorized transportation vehicle in a direction opposite to a current direction of travel.

2. The method of claim 1, wherein the sequential variation of the number of luminous regions is synchronized with a current speed of travel of the motorized transportation vehicle so that relative to the motorized transportation vehicle a speed of the at least one change boundary region moving in the opposite direction to the current direction of travel corresponds to the current speed of travel.

3. The method of claim 1, wherein switching off the number of luminous regions begins the sequential variation of the number of luminous regions.

4. The method of claim 1, wherein an increase or reduction in light intensity of the number of luminous regions or a change from one defined color to another defined color of the number of luminous regions begins the sequential variation of the number of luminous regions.

5. The method of claim 1, wherein luminous regions disposed at least along a lateral window line are varied sequentially.

6. The method of claim 1, wherein luminous regions disposed at least in a lateral strake run are varied sequentially.

7. The method of claim 1, wherein at least luminous regions of lateral attachments are varied sequentially.

8. The method of claim 1, wherein at least luminous regions within areas of a side window are varied sequentially.

9. A motorized transportation vehicle having and configured to operate externally visible lighting along its longitudinal direction, the externally visible lighting having a number of luminous regions which produce a light effect image continuously varying in the longitudinal direction relative to movement of the motorized transportation vehicle, the motorized transportation vehicle comprising: luminous devices for producing the number of luminous regions; at least one wheel sensor; and at least one control device for a sequential actuation of the luminous devices for a variation of the number of luminous regions, wherein signals of the at least one wheel sensor are analyzed by the at least one control device so the at least one control device carries out the sequential actuation of the luminous devices while the motorized transportation vehicle is driving so the light effect image moves with at least one change boundary region relative to the motorized transportation vehicle in an opposite direction to a current direction of travel.

10. The motorized transportation vehicle of claim 9, wherein the signals of the at least one wheel sensor are analyzed by the at least one control device so the at least one control device carries out the sequential actuation of the luminous devices when the motorized transportation vehicle is driving away so that a speed relative to the motorized transportation vehicle of the at least one change boundary region moving in the opposite direction to the current direction of travel corresponds to a current speed of travel.

11. The motorized transportation vehicle of claim 10, wherein switching off the number of luminous regions begins the sequential variation of the number of luminous regions.

12. The motorized transportation vehicle of claim 10, wherein an increase or reduction in light intensity of the number of luminous regions or a change from one defined color to another defined color of the number of luminous regions begins the sequential variation of the number of luminous regions.

13. The motorized transportation vehicle of claim 10, wherein luminous regions disposed at least along a lateral window line are varied sequentially.

14. The motorized transportation vehicle of claim 10, wherein luminous regions disposed at least in a lateral strake run are varied sequentially.

15. The motorized transportation vehicle of claim 10, wherein at least luminous regions of lateral attachments are varied sequentially.

16. The motorized transportation vehicle of claim 10, wherein at least luminous regions within areas of the side window are varied sequentially.

* * * * *